United States Patent [19]
Al-Hamlan

[11] Patent Number: 5,878,955
[45] Date of Patent: Mar. 9, 1999

[54] IRRIGATION DEVICE HAVING A TWO-STEP VALVE ASSEMBLY

[75] Inventor: Saleh A. Al-Hamlan, Riyadh, Saudi Arabia

[73] Assignee: Alswaqi, Riyadh, Saudi Arabia

[21] Appl. No.: 857,247

[22] Filed: May 16, 1997

[51] Int. Cl.[6] .................................................. B05B 12/08
[52] U.S. Cl. ................ 239/66; 137/119.06; 137/624.27; 239/68; 239/443
[58] Field of Search .................................. 239/66, 68, 49, 239/443; 222/20; 137/119.06, 624.27, 872

[56] References Cited

U.S. PATENT DOCUMENTS

| | | | |
|---|---|---|---|
| 1,812,586 | 6/1931 | Elder | 239/68 X |
| 3,964,685 | 6/1976 | Chauvigne | 239/68 X |
| 4,214,602 | 7/1980 | Pradillon | 239/68 X |
| 4,708,264 | 11/1987 | Bruninga | 220/20 |
| 5,100,056 | 3/1992 | Theodorsen et al. | 239/66 X |
| 5,174,499 | 12/1992 | Al-Hamlan | 239/65 |
| 5,176,163 | 1/1993 | Al-Hamlan | 137/119 |
| 5,207,354 | 5/1993 | Hsu et al. | 222/20 X |
| 5,213,130 | 5/1993 | Al-Hamlan | 137/122 |

*Primary Examiner*—Lesley D. Morris
*Attorney, Agent, or Firm*—Dougherty & Troxell

[57] ABSTRACT

An improved flow control irrigation device automatically stops the flow of water to an area when that area has received a predetermined quantity of water and then redirects the water to another area. The device includes a chamber, a carriage assembly, and a two-step valve which is actuated by the carriage assembly. The two-step valve first reduces the static pressure within the chamber and then fully opens an outlet to direct the flow of water to another area. The device also includes internal fluid dampers to protect the device from damage as the carriage assembly and two-step valve are moved from an irrigating position to a bypass position. The irrigation device also includes a pressure release element which facilitates resetting the device to once again deliver water to an area adjacent to the device.

16 Claims, 17 Drawing Sheets

IRRIGATION DEVICE HAVING A TWO-STEP VALVE ASSEMBLY

FIELD OF THE INVENTION

This invention relates to an irrigation device for use in sequentially irrigating a plurality of areas and more particularly to an improved flow controlled irrigation device which automatically stops the flow of water to an area when the area has received a predetermined quantity of water and then redirects the flow of water to another area.

BACKGROUND FOR THE INVENTION

Irrigation systems have been used for many years to provide plants and trees with water at various times during their growing cycle. For example, it has been common practice to provide plants and trees with water by means of irrigation ditches, hoses, sprayers, pipes and other types of apparatus. However, in certain situations such as in orchards where the terrain is uneven, water will run from the high ground to the low. In such cases, the low lying trees may receive more water than those on higher ground.

In other cases where the cost of water is relatively high it is desirable to control the amount of water provided for each area and to avoid wasting water by providing additional water to some plants in order to adequately water others leaving the water on for too long a period.

The above problems have been overcome to a degree by irrigation systems having a plurality of valves with each valve connected by means of pipes to a pressurized source of water. Such systems are disclosed in my earlier U.S. Pat. No. 5,213,130 entitled "Irrigation System" and which is incorporated herein in its entirety by reference. As disclosed therein, an irrigation system includes one or more valve assemblies which are connected in series to a pressurized source of water. Each valve assembly includes a cylindrical housing, a ball valve, an inlet and two outlets with one outlet generally opposite from the inlet in a lower portion of the housing. The other outlet is disposed in an upper portion of the housing and is adapted to direct water to an area of ground for irrigation. A pit and a float are associated with each valve assembly and arranged so that some of the irrigation water will flow into the pit and raise the float. The float is connected to spring biasing means and when the float reaches a predetermined level the ball valve will spring upwardly to close the upper outlet and redirect the water to another assembly. Water pressure will then maintain the valve in that position until it is manually reset.

A further development for an improved system of the aforementioned type is disclosed in another of my U.S. Pat. No. 5,174,499. In the system disclosed therein, the amount of water to be delivered to a given area is independent of any changes in water pressure. For example, an irrigation system in accordance with that invention includes means for storing a force such as a compression spring which is sufficient to overcome a force against the ball-shaped gate member due to the flow of water. Therefore, when the float reaches a predetermined height, the force in the spring is released to thereby direct the flow of water through the second outlet. In such systems, the opening of one outlet and closure of a second is solely dependent on the position of the float, i.e. the water level within a pit.

A more recent development in flow controlled irrigation systems is disclosed in my U.S. Pat. No. 5,176,163 entitled "Flow Controlled Irrigation System". As disclosed therein, a flow controlled irrigation system automatically stops the flow of water to an area when that area has received a predetermined quantity of water and then redirects the water to another area. The system includes an upwardly extending gate member which defines a pair of passages therein. A first of the passages directs water to an area to be irrigated while the second causes the water flow to bypass the area. A flow control member activates the gate member when a predetermined volume of water flows through a meter.

It is now believed that there is a significant commercial market for an improved device for use in systems such as those disclosed in my earlier patents. Such devices allow an individual to preselect a quantity of water to be supplied to a given area and to activate the mechanism automatically when the quantity of water passes through a valve. The improved irrigation devices in accordance with the present invention also offers a number of advantages over my earlier disclosed devices. For example, such systems include pressure release means which facilitate redirecting the flow of water from one area to another, are durable, minimize damage due to abuses in resetting the valve, require less force to reset the valve and minimizes the likelihood of a valve sticking due to the pressure from the water flow.

BRIEF SUMMARY OF THE INVENTION

The present invention contemplates an improved irrigation device for use with a pressurized source of water. The device delivers water to an area for irrigation and includes flow control means which automatically stops the flow of water to an area when the area has received a predetermined quantity of water and then redirects the flow of water to another area or stops the flow.

In essence, the invention contemplates an irrigation device which includes an upwardly extending hollow chamber having an inlet for receiving a flow of water under pressure, two outlets, and water diverting means for delivering or directing a flow of water to one or the other of the outlets. The hollow chamber includes upper and lower portions and a base or base member at the bottom thereof which sealing closes or forms the bottom of the housing. The lower portion also includes an annular inlet for connecting the housing to a pressurized source of water and an annular outlet which is preferably axially aligned with the annular inlet.

The water diverting means comprises a two-step valve assembly which includes first and second valve elements which are preferably pivotally mounted for rotation about a common pivot. A first of the valve elements acts in concert with a second of the valve elements to close off one of the outlets. By closing off one of the outlets, the pressurized water flows to and out of the second of the outlets. The device also includes means for moving a first of the elements away from the second valve element to thereby reduce the water pressure within the chamber by allowing a portion of the water to pass through the first valve element. Means are also provided for moving the second of the valve elements away from the outlet in response to further movement of the first element to thereby allow more of the water to pass through the first outlet.

An important feature of the present invention resides in an upwardly extending gate member or valve. The gate member is fixed to a movable carriage which is slidably disposed within the hollow cylinder and adapted to move up and down within the hollow cylinder. The gate member defines a first passageway in an upper portion thereof which directs a flow of water upwardly to a water distributor or outlet means when the gate member is in a first or lower position ie an irrigation position for directing water to an area adjacent to the device. The water distributor or outlet means may comprise one or more pipes or openings which direct the flow of water to an area for irrigation.

The gate member or assembly also defines a second passageway in a lower portion thereof for connecting the annular inlet and annular outlet when the gate member is in a second or lower position ie a bypass position. With the gate member in the second or lower position, the water flows through the housing and bypasses the first passageway. Nevertheless static pressure will remain in a lower portion of the chamber.

An important aspect of the present invention resides in a novel two-step valve assembly which is provided to reduce the pressure within the housing before fully opening the valve. The two-step valve assembly, which forms a part of the gate member, includes a sealing element and pressure reducing means for reducing the pressure within the housing before fully opening the valve assembly. The sealing element which may comprise a ring-shaped or washer like seal is carried by or forms a part of the first valve element and partially closes the annular outlet, i.e. it extends around the outer periphery of the outlet and extends inwardly therefrom to thereby reduce the cross-sectional area of an opening through which water flows. The valve assembly also includes a solid valve element or flap member for sealing engagement with the ring-shaped element to thereby close off the annular outlet and force the flow of water up through the hollow cylinder and out through the distributing means.

The irrigation device also includes a flow responsive actuating means which automatically stops the flow of water to an area when that area has received a predetermined quantity of water and then redirects the flow of water to another area by means of the gate member. The flow responsive actuating means is operatively connected to the gate member for moving the gate member from its first to its second position in response to a predetermined volume of water passing through the flow response means. As a result, the water flows through the second passageway and out of the fully opened annular outlet.

A preferred embodiment of the invention includes a chamber having an inlet for receiving a flow of water, two outlets and means for diverting a flow of water to one or the other of the outlets. The water diverting means includes a two step valve assembly for releasing the pressure within the chamber by allowing a relatively small amount of water to pass through a first of two valve elements. The water diverting means also includes means for moving the first of the elements away from an outlet in response to movement of the second of the value elements. Means are also provided for moving the valve assembly upward into an upper portion of the chamber to thereby allow the flow of water to flow directly through a lower portion of the chamber from the inlet and out of an axially aligned outlet. An important feature of this embodiment resides in fluid damping means within the chamber for protecting the device from damage as the valve means is moved upwardly in the chamber.

The invention will now be described in connection with the accompanying drawings wherein like numerals have been used to identify like parts.

DETAILED DESCRIPTION OF THE PREFERRED EMBODIMENT OF THE INVENTION

Figure 1:
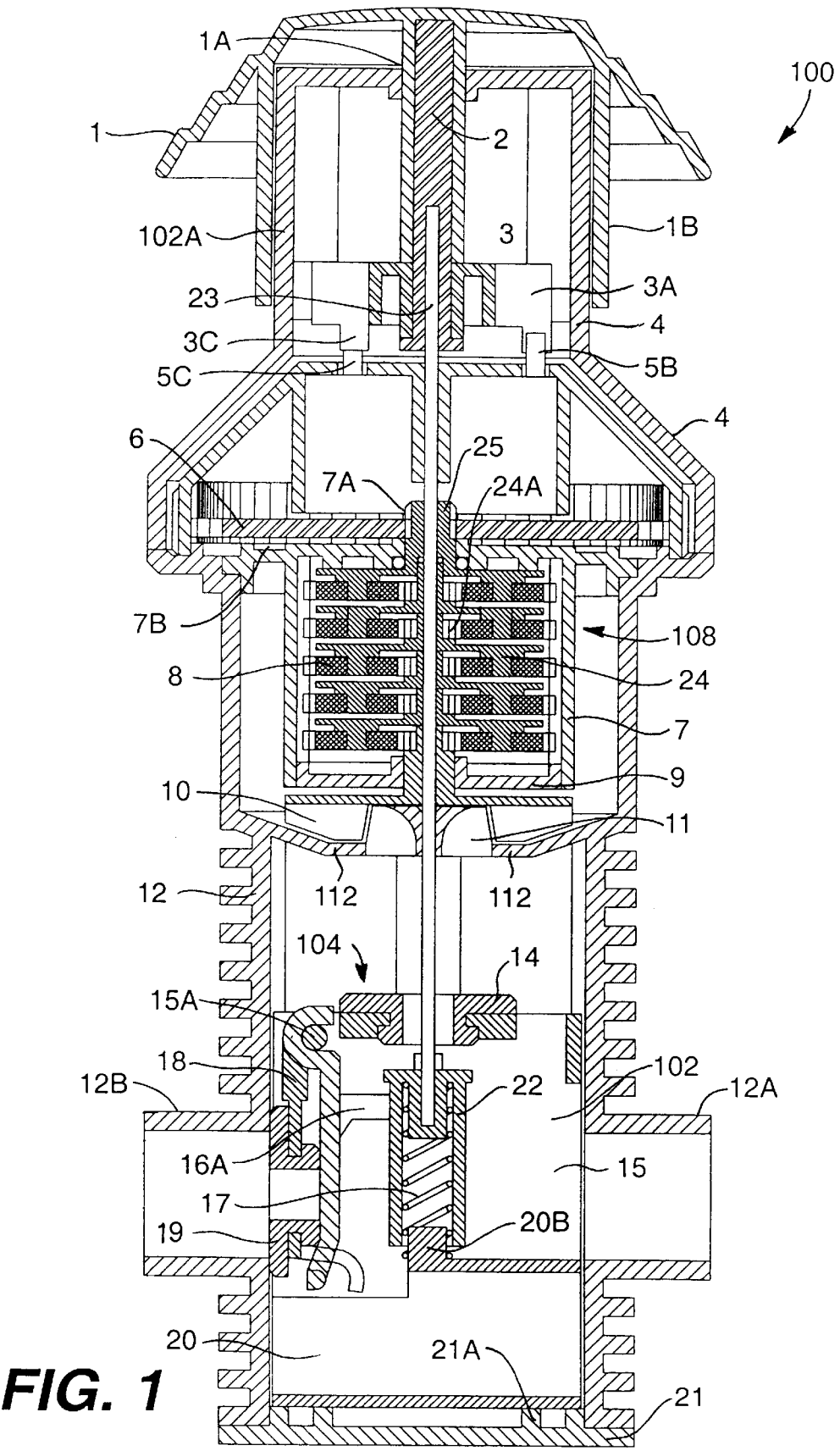
FIG. 1 is a cross-sectional view of an irrigation device according to a preferred embodiment of the invention. As shown, a valve assembly is in a first position with a first outlet fully closed so that water under pressure flows upwardly through a first or upper passageway for delivery to an area for irrigation.
Figure 2:
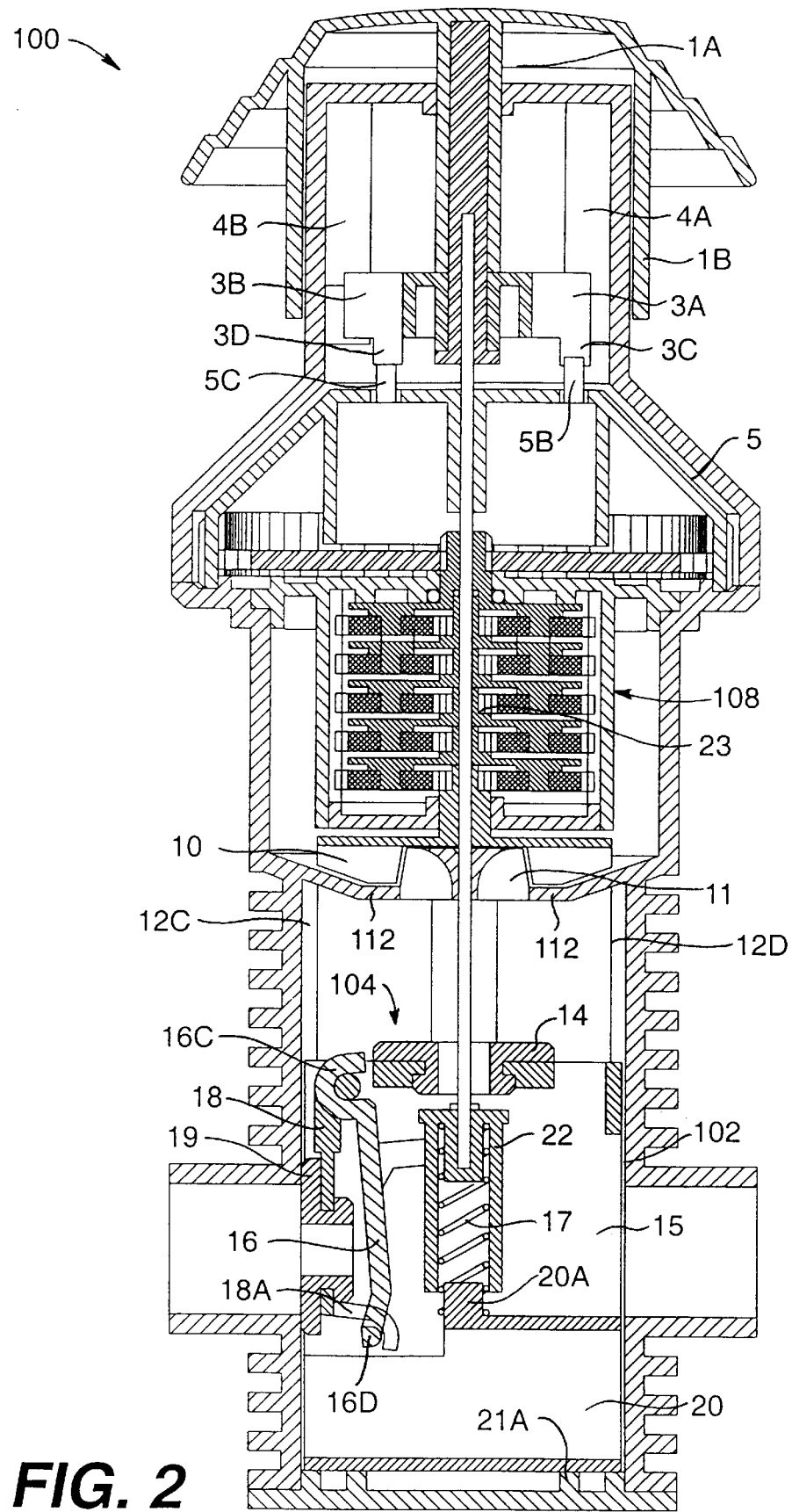
FIG. 2 is a cross-sectional view of the irrigation device shown in FIG. 1, but with the valve assembly in a partially open or pressure reducing position.
Figure 3:
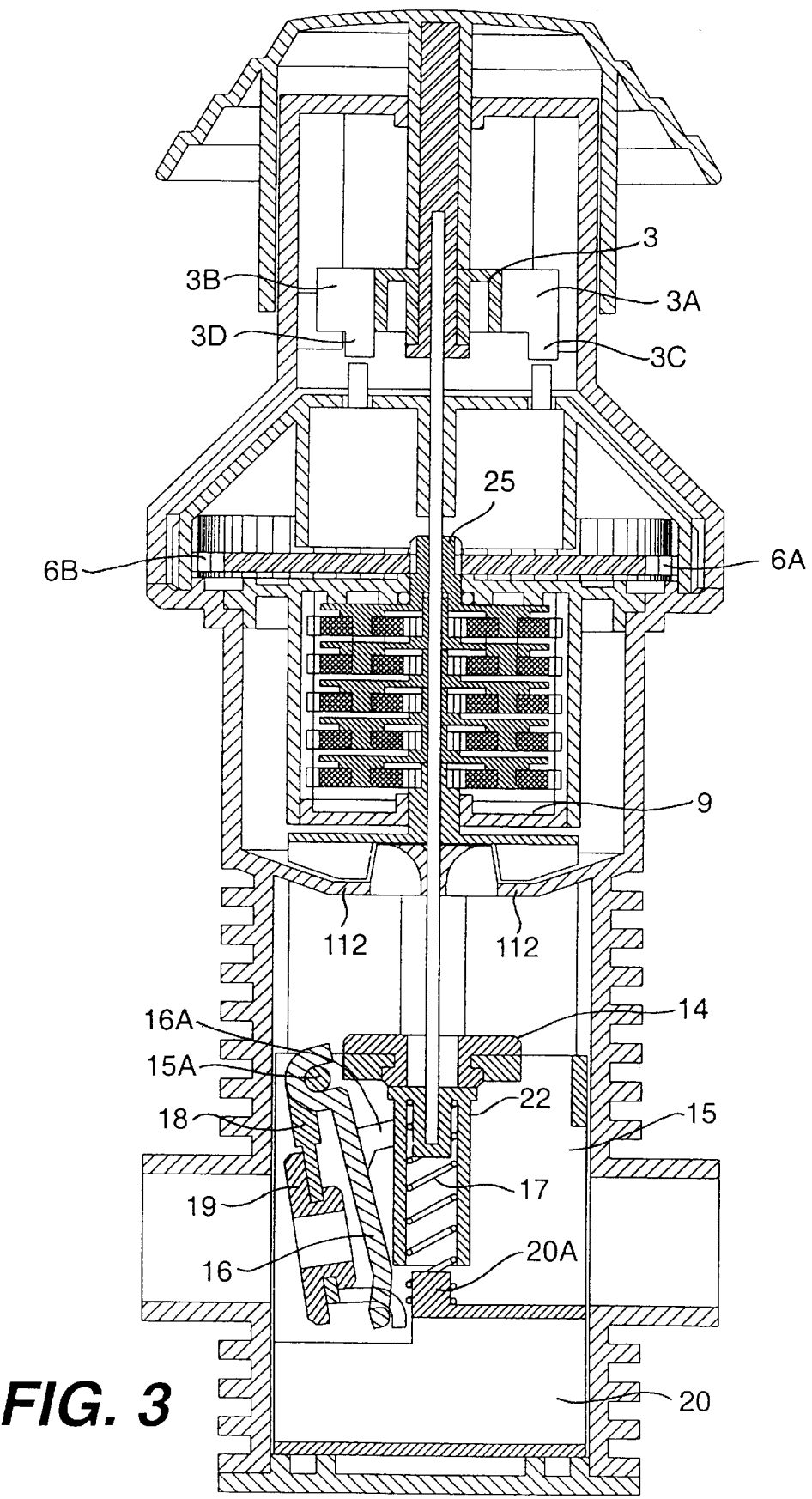
FIG. 3 is a cross-sectional view of the irrigation device shown in FIGS. 1 and 2 but with the valve assembly in a more fully opened position, i.e. with first valve element and flap valve rotated away from an annular outlet.

An improved irrigation device in accordance with a preferred embodiment of the invention is preferably made of ABS plastic or the like. The device distributes water to an area for irrigation and automatically stops the flow of water to an area when the area has received a predetermined quantity of water. The device then redirects the water to another area. The improved irrigation device is for use with a pressurized source of water and constitutes an improvement over an earlier irrigation system which is disclosed in my aforementioned U.S. Pat. No. 5,176,163 which is also incorporated herein in its entirety by references.

As illustrated in the figures, the improved irrigation device 100 in accordance with a preferred embodiment of the invention includes a hollow housing 12. The hollow housing 12 extends upwardly, preferably along a generally vertical axis and defines an upwardly extending hollow cylinder 102 and an annular inlet 12A and annular outlet 12B as shown in FIGS. 1–4. The annular inlet 12A and annular outlet 12B are preferably axially aligned and formed in the lower portion of the hollow housing 12. The housing 12 also includes a base member 21 which forms the bottom of the housing and forms a part of a chamber which is formed by the hollow housing 12. The base member 21 also includes a plurality of risers 21A which limit the downward movement of a gate member 104 as will be described hereinafter.

For descriptive purposes, the irrigation device 100 can be divided into three segments, an upper segment which includes the timing mechanism, visual indicator and reset means, an intermediate segment which includes a motion transmitting mechanism and a lower segment which includes the valve assembly.

The Timing Mechanism

Figure 4:
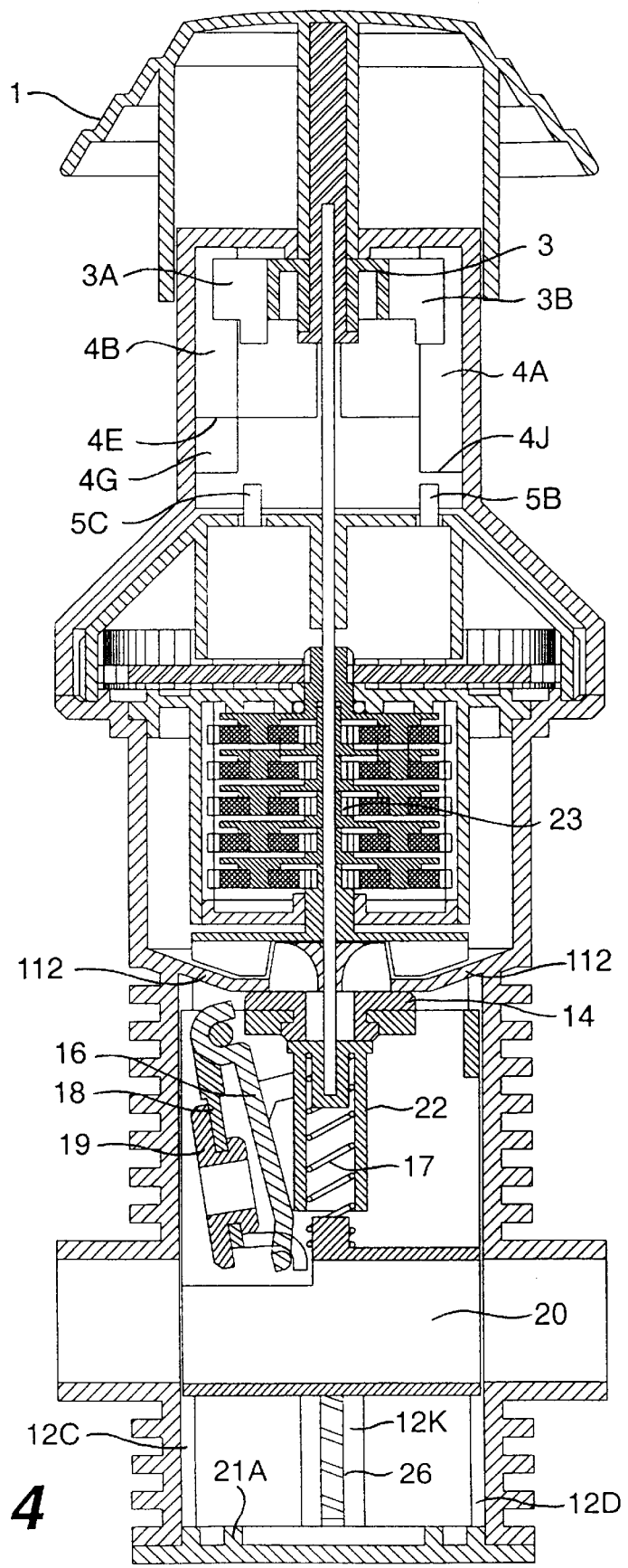
FIG. 4 is a cross-sectional view of the irrigation device shown in FIGS. 1–3 but with the valve assembly in the fully opened position to thereby direct the flow of water to another area for irrigation.

As shown in FIGS. 1–7 the irrigation device 100 includes a rotatable cap 1 which is constructed and arranged for limited rotation and is also adapted to move axially, i.e. up and down between the positions shown in FIGS. 1 and 4. The cap 1 also includes a pair of concentric cylindrical elements 1A and 1B. The inner or smaller cylindrical element 1A has a cylindrical insert 2 positioned therein which serves as a seat for a rod 23. The rod 23, which is preferably made of metal, is also positioned within the cylindrical element 1A by insert 2.

Figure 17:
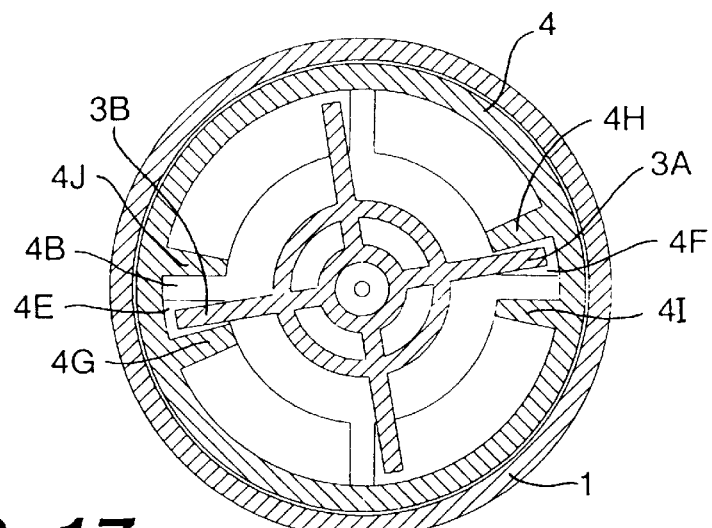
FIG. 17 is a cross-sectional view taken along the line XVII—XVII of FIG. 9.
Figure 18:
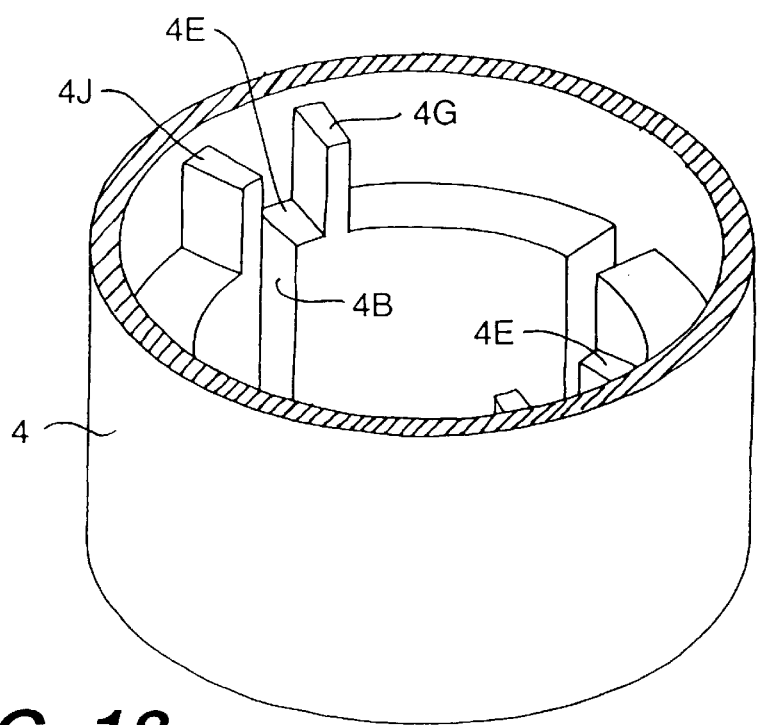
FIG. 18 is an isometric view taken along the section XVII—XVII but shown in an inverted position to illustrate a shoulder portion of the device which holds the device in a first or irrigating position in accordance with a preferred embodiment of the invention.
Figure 25:
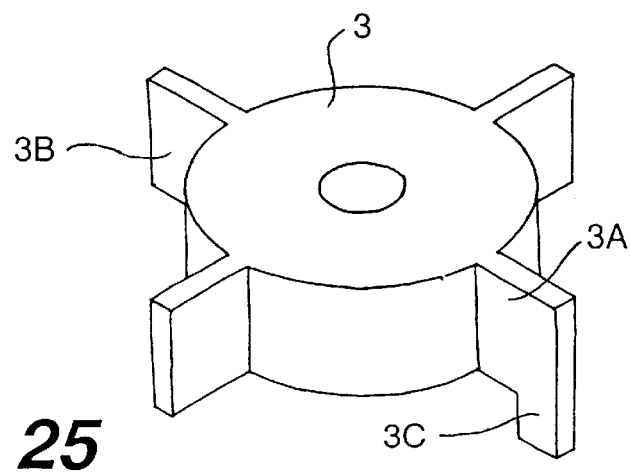
FIG. 25 is an isometric view of an actuating member which is incorporated in a preferred embodiment of the invention.

The outer or larger of the cylindrical elements 1B is constructed and arranged on an upper portion 102A of housing 12 in slidable contact therewith for movement between the positions shown in FIGS. 1 and 4. A cylindrical actuating member 3, which is shown more clearly in FIG. 25, is positioned in abutting relationship to the inner cylindrical element 1A by the cylindrical insert 2. The member 3, as shown more clearly in FIG. 25, includes a plurality of outwardly extending members 3A and 3B each of which includes a downwardly extending contact member 3C. A ring-shaped element 4 (shown in more detail in FIGS. 17 and 18) includes a plurality of slots 4B and 4F and stops 4G, 4H, 4I and 4J. FIG. 18 is shown in an inverted position to show shoulders 4E which prevent the member 3 from moving upwardly until the member 3 is rotated in response to movement by the motion transmitting mechanism at which point members 3A and 3B move upwardly in slots 4B and 4F. The element 4 is disposed within the outer cylindrical element 1B. For example, stop 4J prevents the rotation of actuating member 3 in the wrong direction while stop 4G limits the rotation to a very small angle.

When the rotatable cap 1 is pushed down, the outwardly extending member 3A and 3B slide down in slots 4B and 4F and engage shoulders 4E (see FIGS. 6 and 17) and allows the cylindrical actuating member to be rotated through a small angle. The contact member 3C then engage pins 5B and 5C to rotate the timing ring 5 which is shown more clearly in FIG. 21. The timing ring 5 also includes a pair of spring biased pins 5B and 5C and a plurality of numerals 5D printed thereon. The ring 5 may also include a knurled edge which facilitates manual rotation thereof. The spring biased pins 5B and 5C provide protection against breakage when the contact member 3C engage the tops of the pins 5B and 5C when the cap 1 is pressed down to reset the valve assembly.

Figure 14:
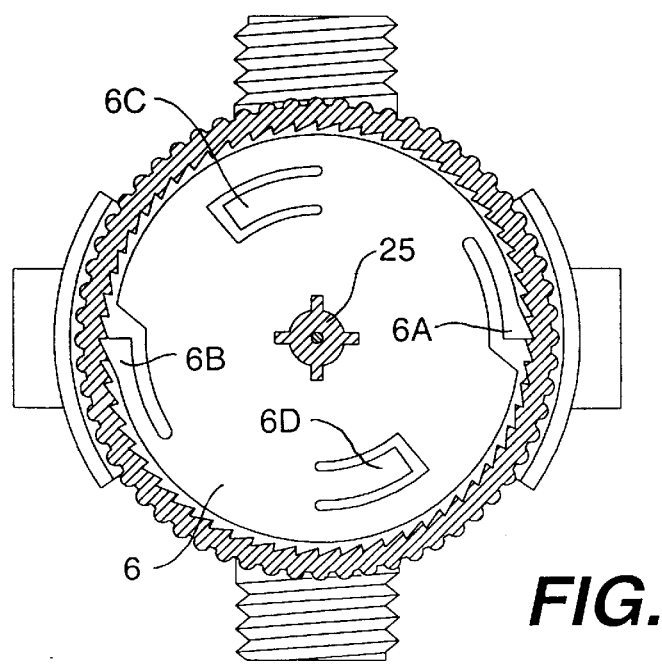
FIG. 14 is a cross-sectional view taken along the line XIV—XIV of FIG. 9.

A circular plate or disk 6 is shown in more detail in FIG. 14. As illustrated therein, the disk 6 includes resilient ratchet means 6A and 6B which allows rotation in a single direction and resilient stop members 6C and 6D. The stop members 6C and 6D engage a ratchet ring 7B in an upper portion of a gear housing 7. The housing 7 also includes a central opening 7A. A drive member 25 passes through opening 7A for engagement with disk 6 as shown in FIG. 14. The drive member 25 rotates the disk 6 in response to rotation of a gear train.

Motion Transmitting Mechanism

The motion transmitting mechanism 108 is of a conventional design and may take the form of the mechanism described in my aforementioned U.S. Pat. No. 5,176,163 or for example, the mechanism as disclosed in a U.S. Pat. of Bruninga, No. 4,708,264 which is also incorporated herein in its entirety by reference.

Figure 10:
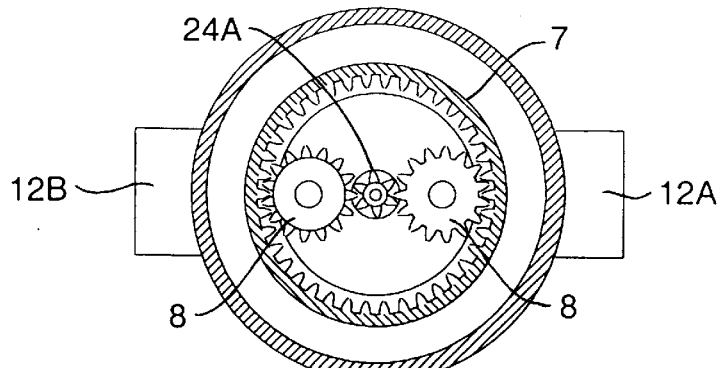
FIG. 10 is a cross-sectional view taken along the line X—X of FIG. 8.
Figure 16:
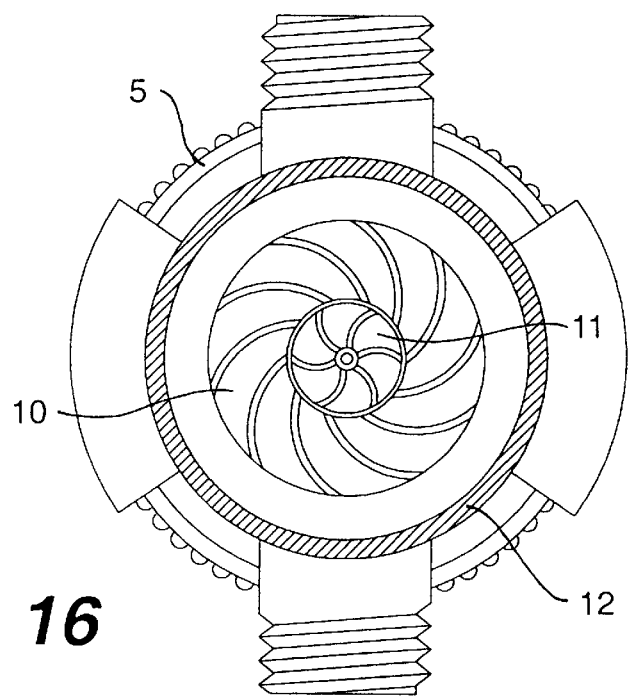
FIG. 16 is a cross-sectional view taken along the line XVI—XVI of FIG. 9.
Figure 22:
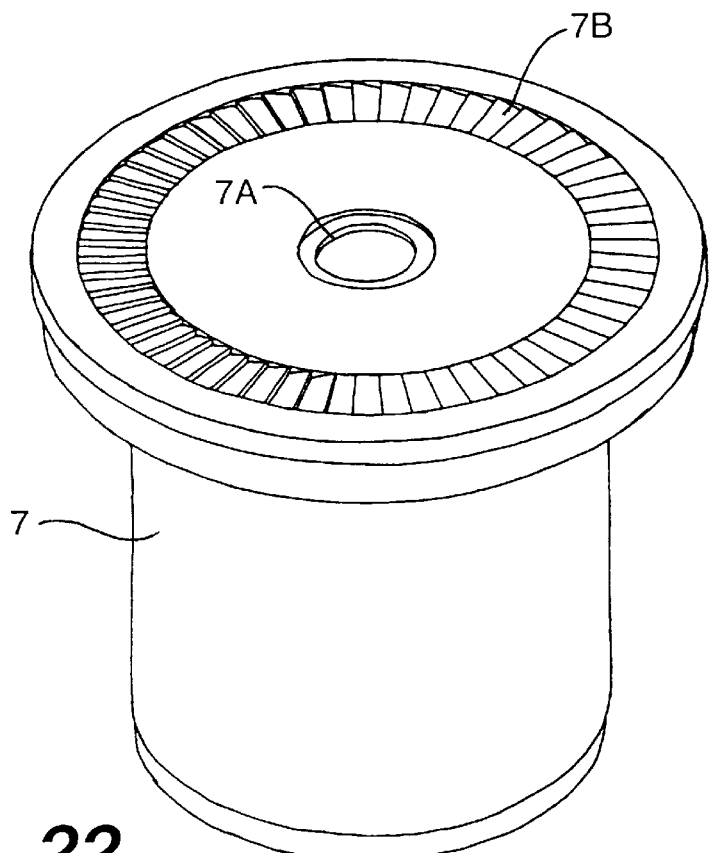
FIG. 22 is an isometric view of a housing including a ratchet portion for use in one embodiment of the invention.
Figure 23:
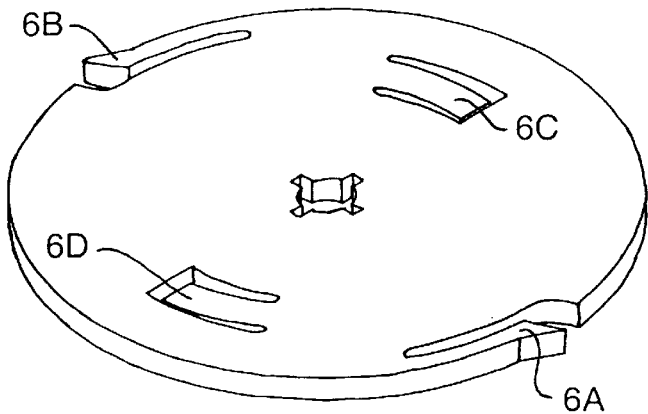
FIG. 23 is an isometric view of a disk plate which is incorporated in a preferred embodiment of the invention.

The motion transmitting mechanism 108 (see FIGS. 1, 10 and 22) includes the gear housing 7 and a closure 9. The mechanism 108 is preferably of the type which includes a plurality of stacked sets of planetary gear assemblies. The inner portion of the housing also has formed on the interior thereof a series of gear teeth which constitute a common orbital gear for the planetary gear sets 8. The planetary gear sets 8 include a gear carrier 24 which is formed with an axial projecting hub portion having gear teeth formed exteriorly thereon. The planetary gears mesh with an input sun gear 24A which is rotated by outer impeller 10 in a conventional manner as will be well understood by a person of ordinary skill in the art. The irrigation device 100 also includes a fixed water diverter 11 (shown more clearly in FIG. 16) which directs the water flow against the impeller 10 to provide rotation in a single direction.

The Valve Assembly

Figure 19:
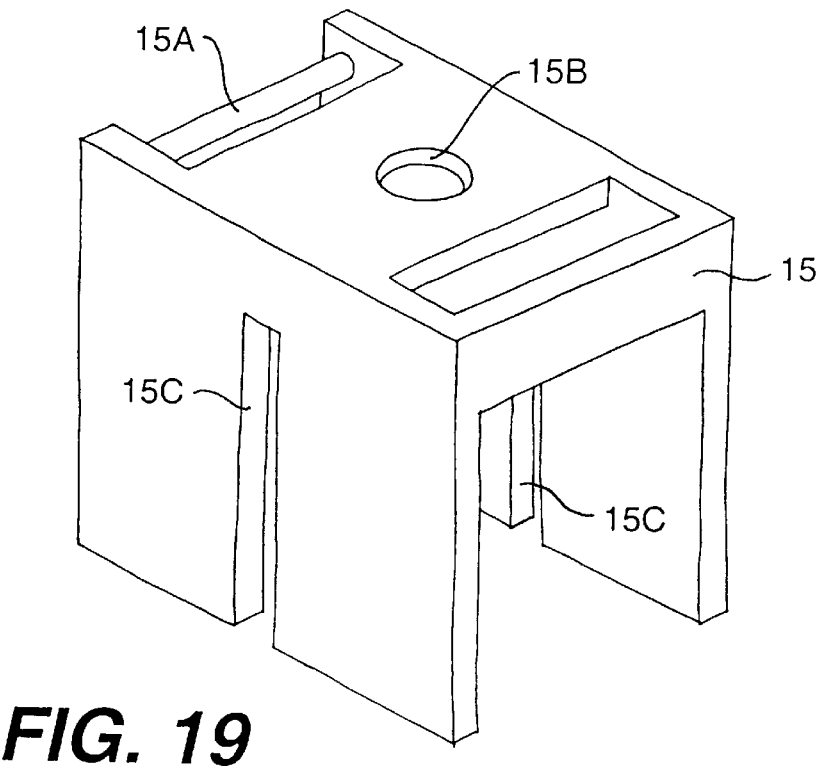
FIG. 19 is an isometric view which illustrates a carriage member for use in the device in accordance with a preferred embodiment of the invention.

The gate member 104 includes a carriage 15 having an upper portion and a lower portion 20 (See FIG. 19) which form first and second passageways for directing a flow of water through the housing 12. (FIGS. 1–4) The gate member 104 also includes a two-step valve which has a first valve element 18 having an annular opening therein and a second valve element 16. The elements 16 and 18 are shown in detail in FIGS. 26 and 27.

Figure 26:
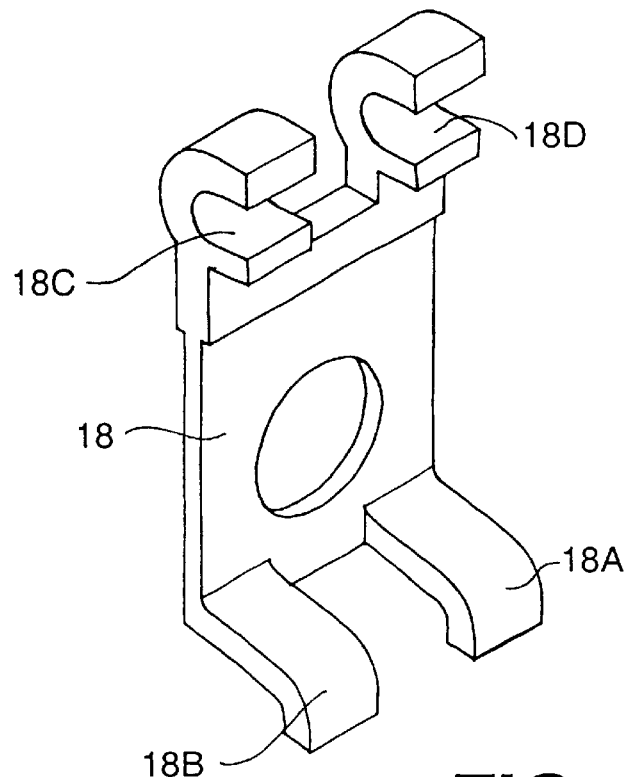
FIG. 26 is an isometric view of a first valve element having an annular opening, pivotal mount, and actuating member for use in an irrigation device in accordance with the preferred embodiment of the invention; and, FIG. 27 is an isometric view of a second valve element for use in an irrigation device in accordance with the preferred embodiment of the invention.

The first element 18 also includes a ring-shaped resilient washer-like structure or element 19 (FIGS. 1–4) which is positioned with respect to the annular outlet 12B by the first element 18 (FIG. 26). The support portion of element 18 is preferably made of a relatively rigid plastic such as ABS which is used for a majority of the device as will be well understood by persons of ordinary skill in the art. Element 18 includes a flat portion having an annular opening therein with a pair of pivotal mounting elements 18C and 18D. In a preferred form of the invention, the element 18 also includes actuating elements or arms 18A and 18B which cause the valve element 18 to pivot about the pivot 15A in response to the rotational movement of element 16.

Figure 27:
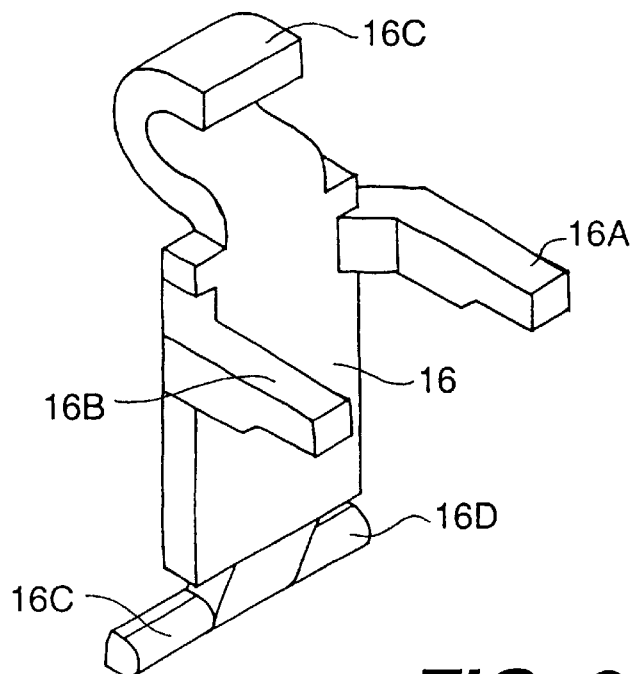

The second valve element 16 is shown more clearly in FIG. 27. As illustrated, the valve element 16 includes a relatively flat portion or flap member and a pivotal mounting member 16C which is adapted to fit between the pivotal mounting elements 18C and 18D and to rotate about pivot 15A. The valve element 16 also includes a pair of upper actuating arms 16A and 16B and lower actuating members 16C and 16D. The lower actuating members 16C and 16D engage actuating elements 18A and 18B for moving the valve element 19 away from the annular outlet 12B.

FIG. 1 shows the irrigation device 100 wherein the gate member 104 is in a fully closed or irrigating position. In this position all of the water flows upwardly through the hollow cylinder 12 and outwardly through water distributing elements 12G and 12H (see FIG. 5) for delivery to an area for irrigation.

Figure 20:
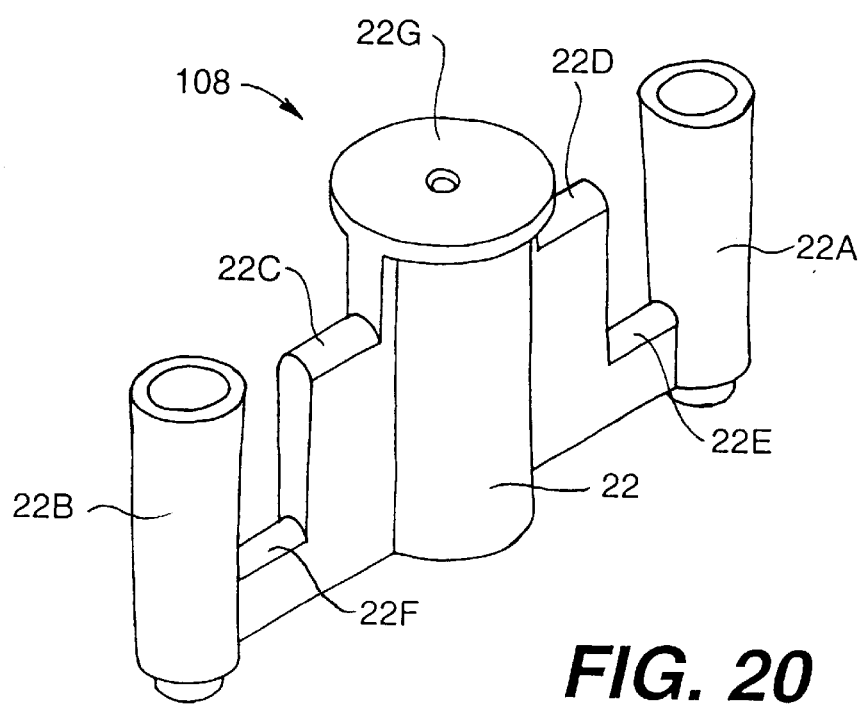
FIG. 20 is an isometric view which illustrates an actuating mechanism in accordance with a preferred embodiment of the invention.

The gate member 104 is associated with the carriage 15 (see FIG. 19) and the motion transmitting mechanism 108 (FIG. 20). The carriage 15 includes a horizontal pivot 15a and a generally flat horizontal top with a central annular opening 15b therein. The carriage 15 also includes a pair of generally vertical slots or channels 15c for receiving the actuating mechanism 108 in sliding engagement therewith so that the actuating mechanism 108 can move up and down within the carriage 15. The motion transmitting mechanism 108 also includes a central cylindrical portion 22 having a flat top 22g and a small opening therein for receiving the rod 23 and for positioning the rod 23 in fixed relationship to the motion transmitting mechanism 108 as shown in FIGS. 1–5. The motion transmitting mechanism 108 also includes a pair of outwardly projecting members which includes shoulders 22c and 22d on an upper portion thereof and a pair of lower shoulders 22e and 22f. The motion transmitting mechanism 108 also includes a pair of outwardly projecting and upwardly extending cylindrical elements 22a and 22b which are formed as an integral part of the mechanism 108.

The upwardly extending cylindrical elements 22a and 22b (see FIG. 5) are constructed and arranged to move up and down within a pair of hollow cylinders 110 and have appropriately sized ball members 13 which ride on top of elements 22a and 22b. The ball members 13 are smaller in diameter than cylinder 110 and act as fluid dampers when the upwardly moving balls 13 force water out of the cylinders 110. This mechanism reduces or eliminates any shock due to the stored energy in springs 26 as the carriage 15 moves upwardly. It reaches the upper limit with the seal 14 firmly against and held in place thereagainst between the top 22G of cylindrical element 22 and inwardly extending position 112 (see FIGS. 1–5).

Another feature of the present invention relates to a seal 14 which may resemble a conventional washer and which is positioned within the central aperture 15b of the carriage member 15. An upper surface of the seal 14 sealingly engages the inwardly extending portion 112 of hollow housing 12 when the valve is in the bypass position. This inwardly extending portion 112 separates the motion transmitting assembly and the valve assembly and surrounds the fixed water diverter 11. A bottom part of the seal 14 sealingly engages the top 22g of the cylindrical portion 22. When the rod 23 is pushed down from the position shown in FIG. 4, toward the position shown in FIG. 1, the top portion 22G of cylindrical portion 22 is moved out of engagement with seal 14 and allows a small amount of water to flow upwardly through the water diverter 11. This small flow reduces the static pressure within the chamber so that a relatively small force on cap 1 is sufficient to move the gate member 104 into position to close off outlet 12B and to direct the flow of water upwardly through the motion transmitting mechanism and outwardly from the water distributing means 12g and 12h.

Figure 24:
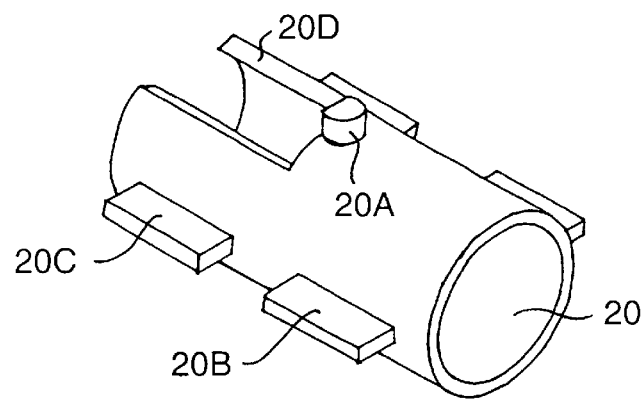
FIG. 24 is an isometric view of a lower passageway in accordance with a preferred embodiment of the invention.

The lower portion 20 of the valve assembly comprises a cylindrical passageway as shown more clearly in FIGS. 1–5 and 24. As shown in FIG. 24 the cylindrical passageway includes a cutout portion 20d which allows a part of the gate member to extend below the top of the passageway and thereby reduce the height of the device. The opening also allows water to fill the lower part of the chamber and maintain static pressure in that portion of the chamber while water is flowing through the lower portion or passageway 20. This static pressure supplements the force of springs 26 in maintaining a seal between the seal 14 and portion 112 and also between the seal 14 and the top 22g of the cylindrical portion 22.

Figure 11:
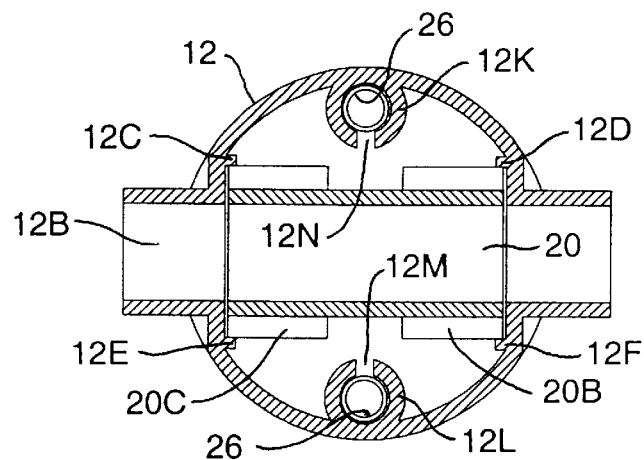
FIG. 11 is a cross-sectional view taken along the line XI—XI of FIG. 8.
Figure 12:
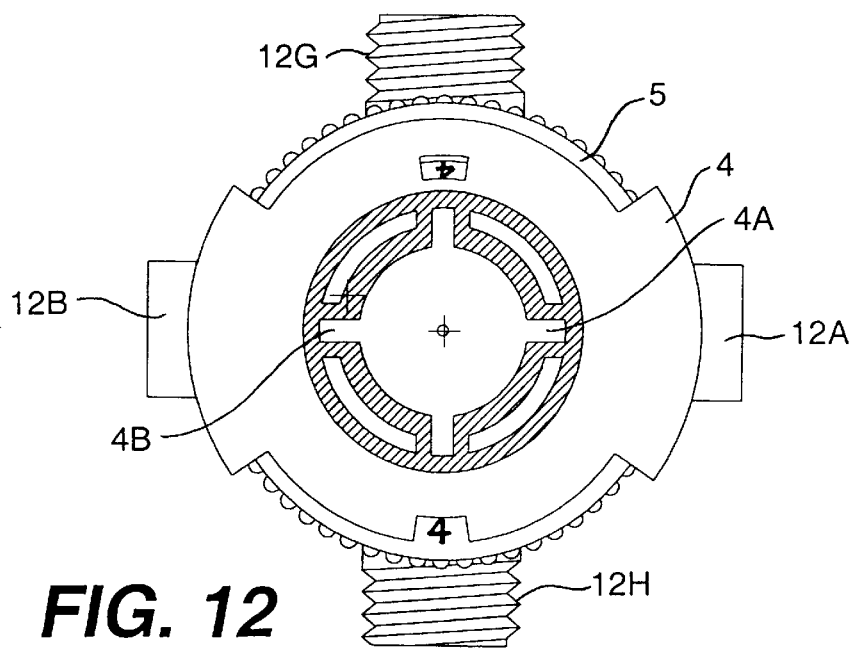
FIG. 12 is a cross-sectional view taken along the line XII—XII of FIG. 8.

The lower portion 20 also includes a plurality of outwardly extending alignment elements 20b and 20c which positions the lower portion 20 within the chamber and aligns the lower portion 20 with the inlet 12a and outlet 12b when the valve assembly is in a second or bypass position. For example, a plurality of inwardly directed channel members 12c, d, e and f as shown in FIG. 11 position the lower portion or passageway 20 by contact with the aligning elements 20b and 20c. As shown in FIG. 11, the housing 12 also includes a pair of generally cylindrical spring retaining elements 12k and 12l which include vertically extending slots or openings 12m and 12n.

The lower portion 20 is fixed to the bottom of carriage 12 by glue, welding or other means and includes a stud 20a. The stud 20a positions and retains a spring 17 (see FIGS. 1 and 4) which extends upwardly into cylindrical portion 22. The spring 17 biases the cylindrical portion 22 upwardly into sealing engagement with seal 14 when the valve assembly is in a bypass position and cushions the downward movement when the lower portion or passageway 20 is pushed down into the bottom of the chamber against risers 21a.

Figure 13:
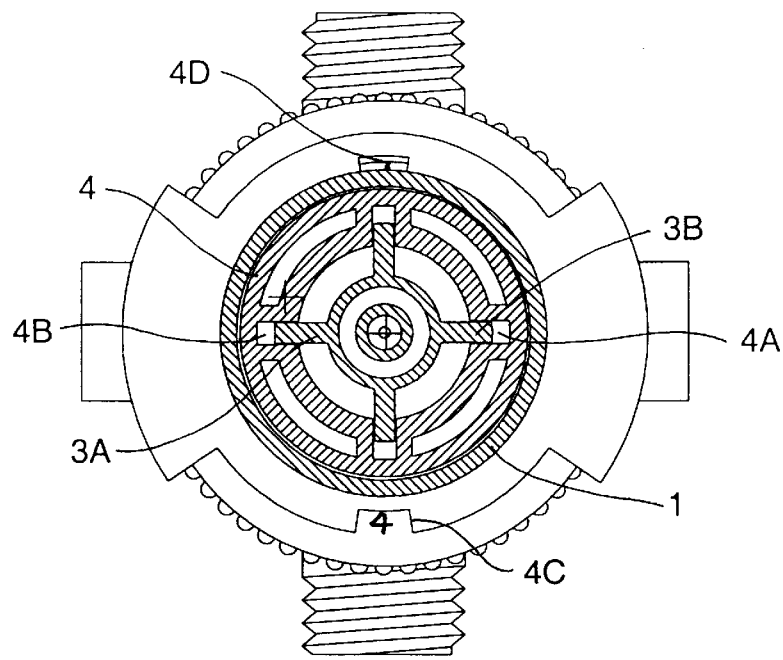
FIG. 13 is a cross-sectional view taken along the line XIII—XIII of FIG. 8.
Figure 15:
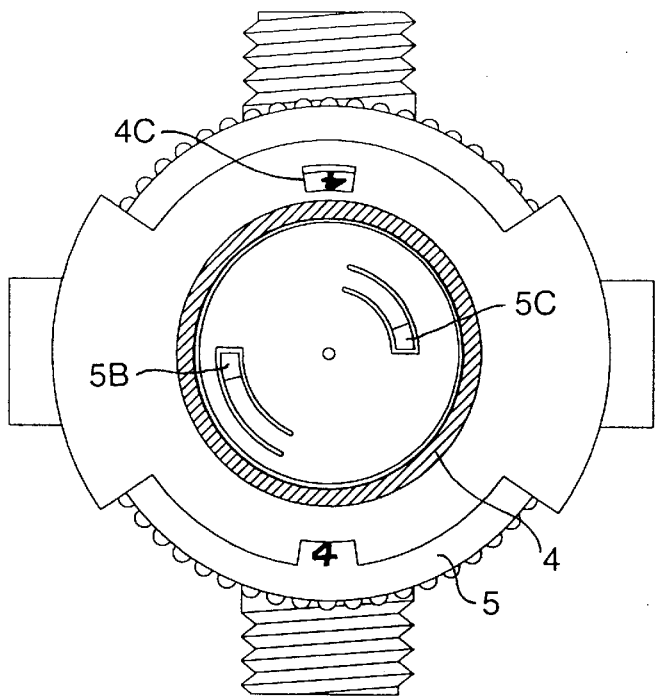
FIG. 15 is a cross-sectional view taken along the line XV—XV of FIG. 8.

FIG. 13 shows the relationship between the cylindrical actuating member 3 and the ring-shaped element 4 when the valve assembly is in a first position for irrigating an adjacent area (FIG. 1) as opposed to a bypass position as shown in FIG. 4. As shown in FIG. 13, the upwardly extending members 3a and 3b are positioned within slots 4a and 4b of element 4. As illustrated "4" appears in window 4c and a dot is shown in window 4d. The dot which appears in window 4d maybe a "4" as shown in FIG. 15 so that the number can be seen from either side of the device.

Figure 6:
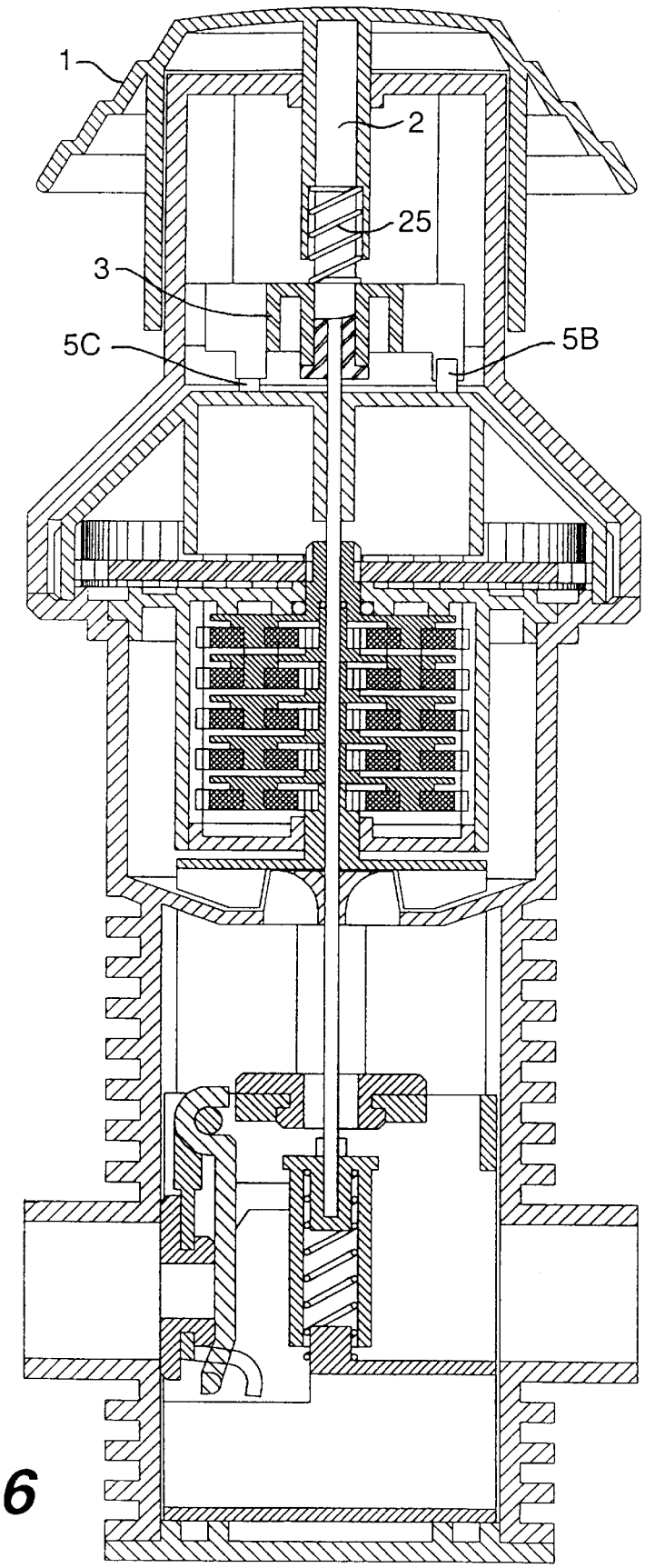
FIG. 6 is a cross-sectional view of the irrigation device shown in FIG. 1, but with a portion of the cap area broken away to illustrate a further embodiment of the invention.
Figure 7:
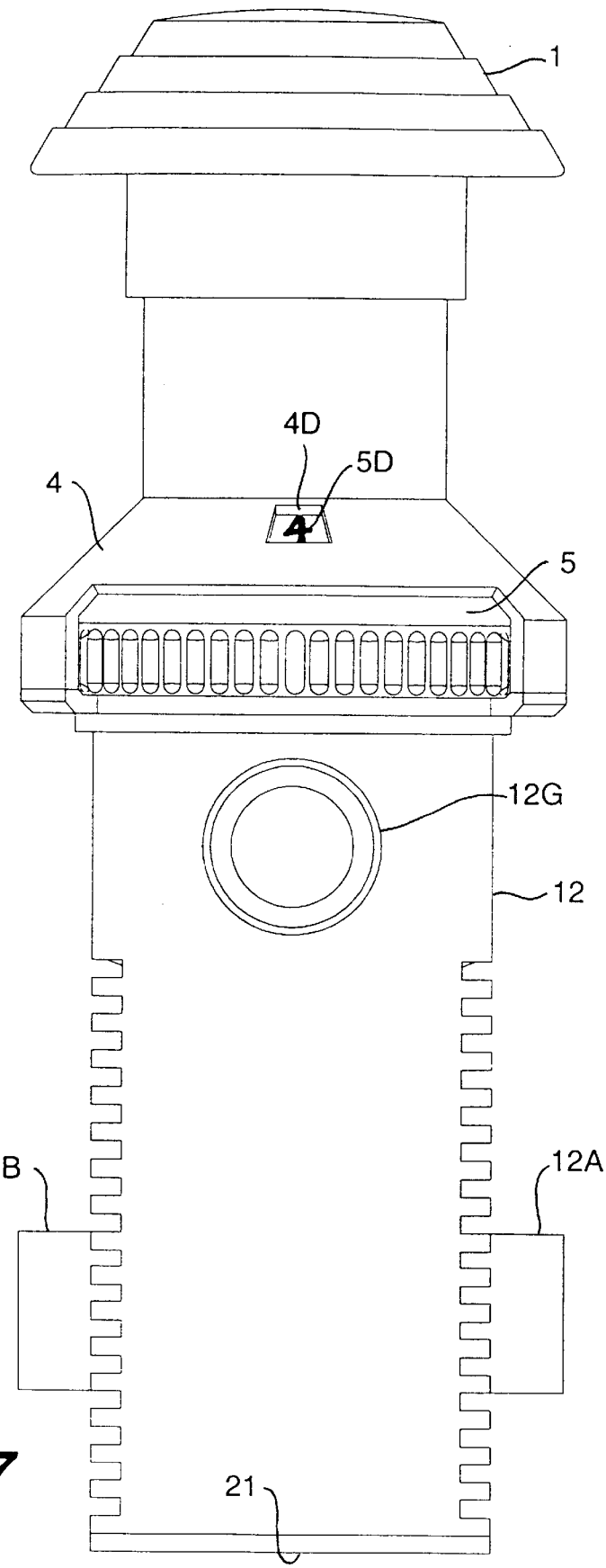
FIG. 7 is a side elevational view of the irrigation device shown in FIG. 4, with a visual indication i.e. an elevated cap to show that the flow of water is passing through the device to another area for irrigation.
Figure 8:
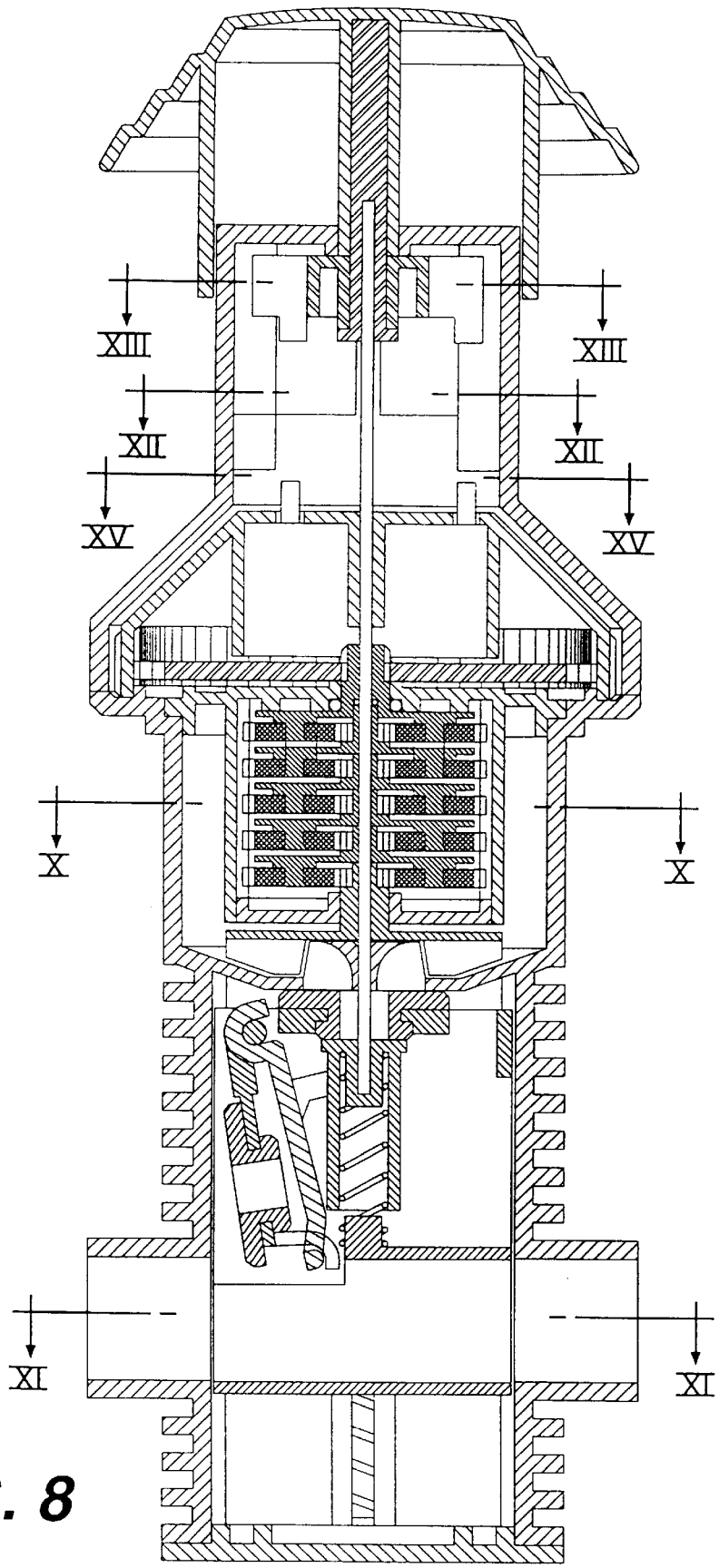
FIG. 8 is a cross-sectional view of the irrigation device show in FIG. 4, but showing the section lines for subsequent figures.
Figure 9:
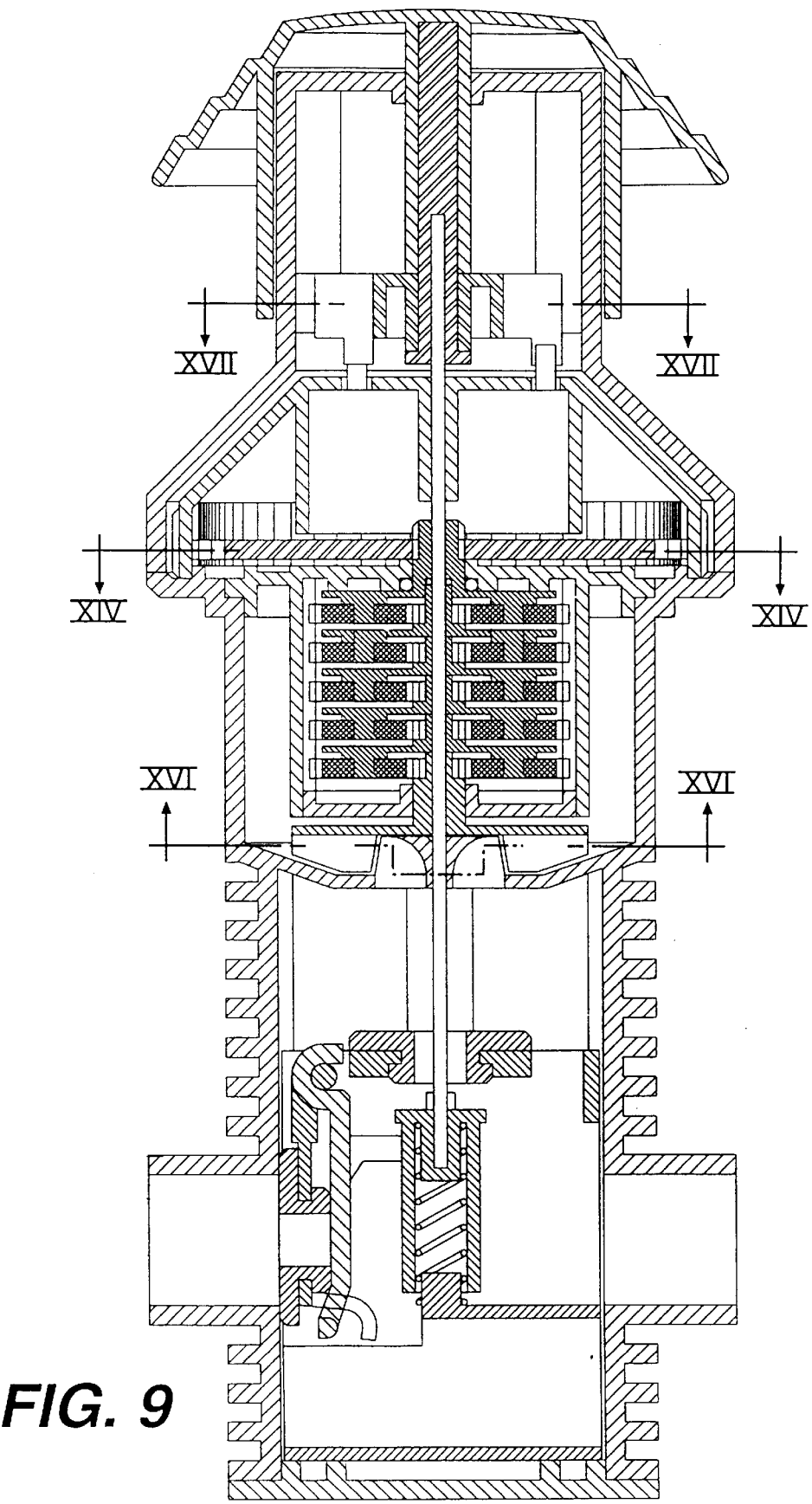
FIG. 9 is a cross-sectional view of the irrigation device shown in FIG. 1, but showing the section lines for subsequent figures.

FIG. 6 illustrates a further embodiment of the invention wherein the inner cylindrical portion 1A of rotatable cap 1 is separated from the actuating member 3 by means of a spring 25. This spring 25 is provided to avoid breakage when the position 1A comes into contact with the actuating member 3.

Operation of the Device

Figure 21:
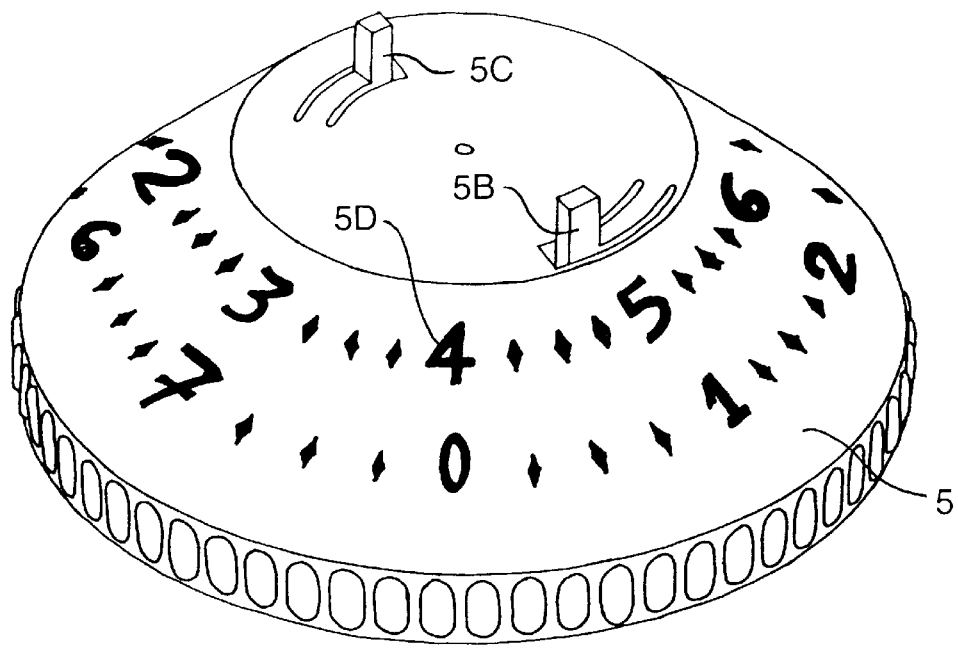
FIG. 21 is an isometric view of an indicator ring in accordance with one embodiment of the invention.

In the operation of the improved irrigation device in accordance with the present invention, an individual determines the quantity of water to be delivered to a given area and selects that quality by rotating the timing ring 5 (see FIG. 21). The timing-ring 5 is rotated until one of the numerals 5*d* which corresponds to the desired quality of water appears in window 4*d* (see FIG. 7). The individual then sets or resets the device as shown in FIG. 4 by pressing down on the rotatable cap 1 in order to close the annular outlet 12*b* and direct the flow of water upwardly through the generally vertical hollow housing 102 and out of the water distributing outlets 12*g* and 12*h*. It should be recognized that more or less outlets may be provided or other means such as a spray head may be attached to the outlets.

When an individual presses down on the rotatable cap, it is necessary to overcome the static pressure within a lower portion of the device. Therefore, a pressure release valve which is formed by seal 14 which is made from a suitable resilient material such as rubber or the like and the top of cylindrical portion 22 is broken when the rod 26 forces the cylindrical portion 22 of the actuating member 108 downwardly and away from the seal 14. This movement allows water to flow through an aperture in seal 14 to reduce the static pressure therein. This pressure reduction reduces the force required to overcome the spring 26 and static pressure so that the entire valve assembly or gate member 104 can be easily pushed down and into the irrigating position as shown in FIG. 1.

With the valve assembly in the irrigating position ie to irrigate an area adjacent to the device, water flows upwardly in the hollow housing 12 and through the water diverter 11. The water flow then impinges on and rotates the impeller 10 which in turn rotates the motion transmitting mechanism. The purpose of the motion transmitting mechanism is to transmit the rotation of the impeller 10 with substantial reduction to disk 6 by means of shaft 25.

Figure 5:
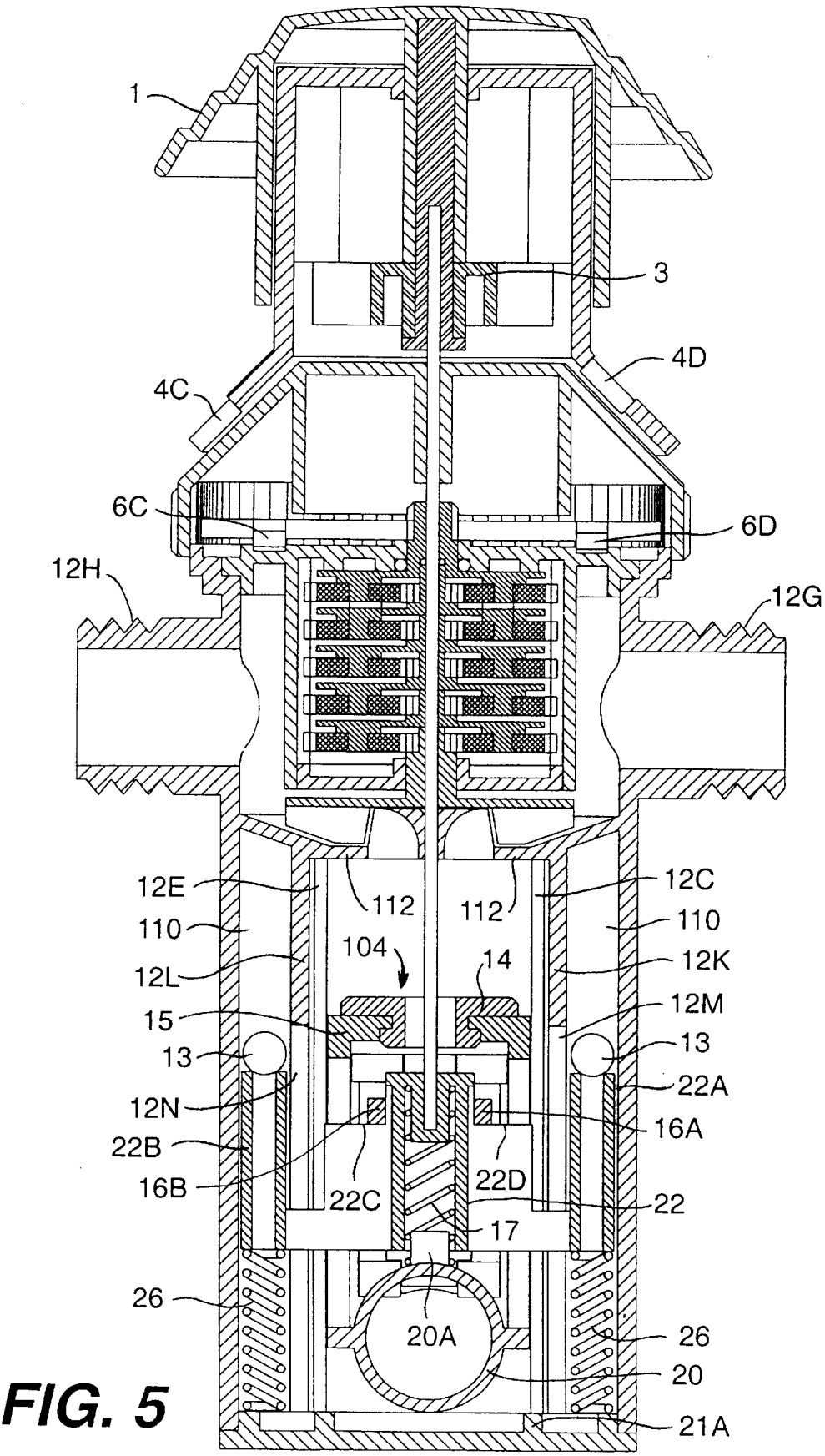
FIG. 5 is a cross-sectional view of the irrigation device shown in FIG. 1 but rotated 90° about its vertical axis.

For example, when the impeller 10 rotates perhaps 1 million times, the disk 6 will rotate pins 5B and 5C (see FIG. 21) which rotate contact member 3C and member 3A and 3B out from under shoulder 4E which allows actuating member 3 to move upwardly due to the force of springs 26 (FIG. 5). The reduction, of course, depends on the number of gears and their diameters as will be well understood by those skilled in the art of manufacturing water meters and other water flow control devices.

When the shaft 25 rotates the disk 6 sufficiently, it releases the rotatable cap 1 and related structure for axial or upward movement. As the cap 1 and rod 23 start to move upwardly, the actuating shoulders 22*c* and 22*d* of actuating mechanism 22 lift the arms 16*a* and 16*b* which rotates the second valve element 16 and allows water to flow around element 16 and out of outlet 12 through an aperture in the first valve element 18 to thereby reduce the pressure. As the pressure is reduced, the further rotation of element 16 allows the gate member to move upwardly in response to the force stored in springs 26. And, as the cylindrical portion 22 moves upwardly, the fluid dampers, balls 13 and cylinders 110 reduce or eliminate the shock or damaging force as the seal 14 engages portion 112. This movement positions the lower portion 20 as it moves upwardly with carriage 15 and redirects the flow of water to another area.

While the invention has been described in connection with its preferred embodiment, it should be recognized that changes and modifications may be made therein without departing from the scope of the appended claims.

What is claimed is:

1. An irrigation device for use with a pressurized source of water comprising a hollow valve housing which defines an upwardly extending hollow cylinder with upper and lower portions and a base at the bottom of said housing, said lower portion defining an annular inlet for connecting said housing to the pressurized source of water and an annular outlet, an upwardly extending gate member slidably disposed within said hollow cylinder of said housing and adapted to move up and down within said hollow cylinder, said upwardly extending gate member defining a first passageway in an upper portion of said housing when said gate member is in a first or irrigating position, distributing means for directing a flow of water outwardly from said upper portion of said upwardly extending hollow cylinder and onto an area to be irrigated when said gate member is in the first position, said gate member defining a second passageway in a lower portion of said housing for connecting said annular inlet and said annular outlet when said gate member is in a second or bypass position so that a flow of water bypasses said upper portion of said hollow cylinder and flows out of said annular outlet, said gate member including a two-step valve assembly having a first valve element for reducing the cross-sectional area of said annular outlet and a second valve element for sealing engagement with said first valve element for closing said annular outlet to thereby direct a flow of water up through said hollow cylinder and out through said distributing means, a flow responsive means operatively connected to said gate member for moving said gate member from its first to its second position in response to a predetermined volume of water passing through said flow responsive means whereby the flow of water passing through said inlet flows outwardly through said outlet.

2. An irrigation device according to claim 1 in which said base member extends across and closes the bottom of said housing to thereby form a hollow chamber.

3. An irrigation device according to claim 2 in which said annular inlet and said annular outlet are axially aligned.

4. An irrigation device according to claim 3 in which said first valve element includes an annular opening therein and a ring-shaped sealing element which is in sealing engagement with an outer periphery of said annular outlet.

5. An irrigation device according to claim 4 wherein said sealing element is rubber.

6. An irrigation device according to claim 4 wherein said gate member includes a pivot and said first valve element is pivotally mounted on said pivot.

7. An irrigation device according to claim 6 wherein said closing member is a flap valve which is pivotally mounted on the same pivot as said first valve element.

8. An irrigation device according to claim 7 wherein said second valve element includes means for rotating said first valve element about said pivot.

9. An irrigation device according to claim 8 wherein said second valve element includes an actuating element and said actuating element being operatively connected to said flow responsive means so that said actuating element rotates said first valve element about said pivot after a pre-selected volume of water flows out of said distributing means.

10. An irrigation device according to claim 9 wherein said second valve element includes means for engaging said first valve element and for rotating said first valve element about said pivot and away from said annular outlet after the water pressure in said housing has been reduced by rotation of said second valve element out of sealing engagement with said first valve element.

11. An irrigation device for use with a pressurized source of water comprising a chamber having an inlet for receiving a flow of water, two outlets and water diverting means for delivering a flow of water to one or the other of said outlets, said water diverting means including a two-step valve assembly including first and second valve elements, a first of said valve elements acting in concert with a second of said valve elements to close off one of said outlets to thereby direct a flow of water to the other of said outlets, means for moving a first of said elements away from the second of said elements to thereby reduce the water pressure within said chamber by allowing a portion of said water to pass through said second of said elements, means for moving said second of said one of said elements in response to further movement of a first of said elements.

12. An irrigation device according to claim 11 which includes means for moving said first and said second valve elements out of the flow between said inlet and said one of said outlets.

13. An irrigation device according to claim 12 in which said first and second valve elements are pivotally mounted for rotation about a common pivot.

14. An irrigation device according to claim 13 which includes a carriage having said two step valve assembly pivotally mounted thereon and an actuating mechanism for moving said valve assembly out of the flow of water between said inlet and one of said outlets.

15. An irrigation device according to claim 14, which includes fluid damping means within said chamber for damping the movement of said carriage as it moves said valve assembly from a first to a second position.

16. An irrigation device according to claim 15, which includes pressure release means within said chamber for reducing the static pressure within said chamber in order to facilitate the repositioning of said two-step valve assembly to close off one of said outlets.

\* \* \* \* \*